United States Patent [19]

Cohen

[11] Patent Number: 4,515,300
[45] Date of Patent: May 7, 1985

[54] MULTIPLE-USE SPORTS BAG AND METHOD OF CONVERTING IT TO A BACKPACK

[76] Inventor: Carole Cohen, 6 Kingwood Dr., Poughkeepsie, N.Y. 12601

[21] Appl. No.: 605,390

[22] Filed: Apr. 30, 1984

[51] Int. Cl.³ .......................... A45C 9/00; A45F 3/04
[52] U.S. Cl. ................ 224/151; 224/30 A; 224/153; 224/253
[58] Field of Search ............... 190/103, 110; 383/4; 224/151, 30 A, 201, 202, 205, 253

[56] References Cited

U.S. PATENT DOCUMENTS

| | | | |
|---|---|---|---|
| Re. 25,826 | 8/1965 | Ward | 190/109 X |
| 1,397,161 | 11/1921 | Clemetson | 224/151 X |
| 2,224,568 | 12/1940 | Altorfer | |
| 2,515,316 | 7/1950 | Schjelderup | |
| 2,552,443 | 5/1951 | Molinari | |
| 3,769,733 | 11/1973 | Nelson | 224/253 X |
| 3,802,613 | 4/1974 | Droeger | 224/153 |
| 3,813,017 | 5/1974 | Pimsleur | 224/253 X |
| 4,018,369 | 4/1977 | Jaeger | 224/209 |
| 4,059,207 | 11/1977 | Jackson et al. | |
| 4,066,196 | 1/1978 | Jackson et al. | |
| 4,085,873 | 4/1978 | Schweitzer | 224/153 X |
| 4,177,909 | 12/1979 | Haskell | |
| 4,186,859 | 2/1980 | Frankfort et al. | 224/151 X |
| 4,273,274 | 6/1981 | Freistadt | 224/153 X |
| 4,301,849 | 11/1981 | Litwack et al. | 150/103 |
| 4,423,834 | 1/1984 | Rush | 224/151 |

FOREIGN PATENT DOCUMENTS 237293  4/1945  Switzerland ........................ 224/151

*Primary Examiner*—Stephen Marcus
*Assistant Examiner*—Robert Petrik
*Attorney, Agent, or Firm*—Wenderoth, Lind & Ponack

[57] ABSTRACT

A multiple-use sports bag may be easily convertible to one of four separate bags: a bike bag, a shoulder bag, a belt bag, and, in particular, a backpack.

The multiple-use sports bag comprises a pouch-like body having a first open storage space and a space adjacent thereto, a backpack folded up inside the adjacent space, Velcro strips for securing the backpack inside the body, a first zipper for providing access to the backpack, and pull tabs on opposite sides of the zipper for opening and closing the pouch. In a second embodiment, a second zipper is arranged parallel to the first zipper and extends almost completely around three contiguous walls of the pouch-like body. This second zipper provides access to a second open storage space on another side of the pouch-like body and allows the pouch-like body to open and close a suitcase-like manner.

13 Claims, 11 Drawing Figures

MULTIPLE-USE SPORTS BAG AND METHOD OF CONVERTING IT TO A BACKPACK

BACKGROUND OF THE INVENTION

1. Field of the Invention

The present invention relates to a multiple-use sports bag which may be easily converted to one of four separate bags: a bike bag, a shoulder bag, a belt bag ("fanny" pack or ski bag), and, in particular, a backpack, simply by manipulating the bag itself.

2. Description of the Prior Art

Usually, it is necessary for a person engaged in multiple sports, such as bicycling, hiking, skiing, or mountain/rock climbing, to purchase a plurality of bags, one for each different sport. The need for four or more separate bags requires an unwarranted expenditure of funds. Also, when a person is participating in one or more activities requiring a different kind of bag at the same time, the carrying of any extra bags may become awkward.

Therefore, in the prior art, various attempts have been made to combine one or more bags for different sports into an easily convertible single multiple-use sports bag.

For example, in U.S. Pat. No. 2,224,568 issued in 1940, Altorfer discloses a ski bag combining a shoulder bag, a backpack, and a belt bag. However, the bag is convertible only by adjusting certain straps and not by manipulating the bag itself.

In U.S. Pat. No. 2,515,316 issued in 1950, Schjelderup discloses a bag which may be used as either a shoulder bag, a bike bag, or a belt bag. However, like the bag of Altorfer, Schjelderup's bag is not convertible by manipulating itself. Only changes in the straps allow the bag to be converted from one use to another use.

In U.S. Pat. No. 2,552,443 issued in 1951, Molinari discloses a bag which is convertible to either a bike bag or a shoulder bag. Again, no change in the bag itself is made, only a change in a drawstring.

In U.S. Pat. No. 4,059,207 issued in 1977, Jackson et al. disclose a motorcycle tank bag which is secured by Velcro strips to the top of a motorcycle fuel tank. The bag may be detached from the motorcycle tank and converted to a backpack. A belt bag may be further detached from the backpack.

In U.S. Pat. No. 4,066,196 issued in 1978, Jackson et al. disclose a bag which may be used as both a bike bag and a shoulder bag. Again, the change is not made by converting the bag itself but rather by adjusting various attachments for the bag.

In U.S. Pat. No. 4,177,909 issued in 1979, Haskell discloses a purse which is convertible to either a backpack or a shoulder bag. Although the purse itself is convertible, the larger backpack is not stuffed into any smaller bag.

In view of the known prior art, it remains a problem to develop and commercially exploit a multiple-use sports bag easily convertible to one of four separate bags simply by manipulating the bag and an attached Velcro strip instead of by adjusting a plurality of straps attached to the bag.

While the bags of the prior art can be adjusted by one or more straps, the present invention departs from the prior art because, in addition to adjustment by the straps, the pouch-like body can also be manipulated by itself to change its configuration.

SUMMARY OF THE INVENTION

A primary object of the present invention is to provide a multiple-use sports bag easily convertible to one of four separate bags simply by manipulating the bag itself.

The multiple-use sports bag comprises a pouch-like body having a first open storage space and a space adjacent thereto. A backpack is folded up inside the adjacent space and Velcro strips secure the backpack inside the pouch-like body. A first zipper provides access to the backpack and pull tabs on opposite sides of the zipper open and close the pouch. In a second embodiment, a second zipper is arranged parallel to the first zipper and extends almost completely around three contiguous walls of the pouch-like body. This second zipper allows the pouch to open and close in a suitcase-like manner.

The present invention also includes a method of converting the multiple-use sports bag to a backpack comprising several steps manipulating the bag itself.

These steps and other features of the present invention, as well as further objects and the advantages thereof, will become clear from the following description of the two embodiments mentioned above.

DETAILED DESCRIPTION OF THE PREFERRED EMBODIMENTS

A detailed description of the two preferred embodiments of the present invention, as it is illustrated in FIGS. 1-11, will now be made.

Figure 1:
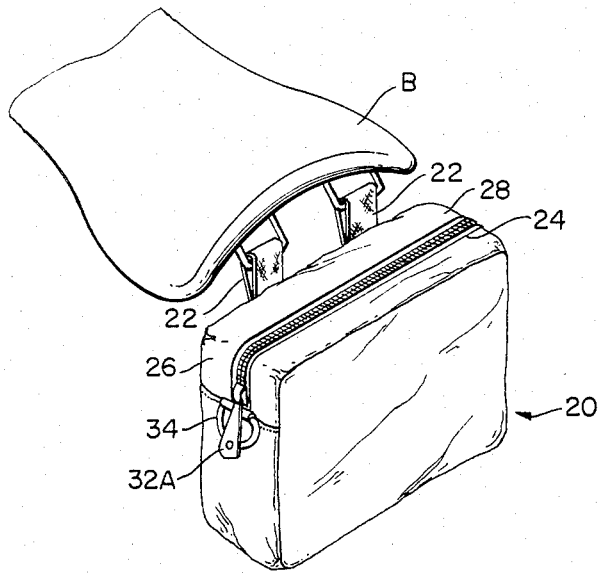
FIG. 1 is a schematic view of a first embodiment of the multiple-use sports bag of the present invention being used as a bike bag attached to the rear of a bicycle seat.

In FIG. 1, a first embodiment of a multiple-use sports bag 20 of the present invention is shown as a pouch having six rectangular walls. The bag 20 is attached by loops 22 to the rear end of a bicycle seat B. A zipper 24 closes an opening in the bag 20 and extends from one side wall 26, across a top wall 28, to an opposite side wall 30, shown in FIGS. 2 and 3. A pull tab 32A opens and closes the zipper 24 from the outside.

Figure 2:
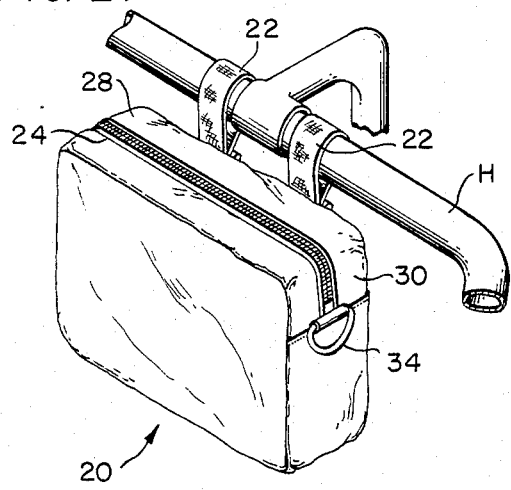
FIG. 2 is another schematic view of the first embodiment of the present invention also being used as a bike bag but attached to front handlebars of a bicycle.

In FIG. 2, the first embodiment of the bag 20 is shown attached by the loops 22 to handlebars H on the front of a bicycle. Rings 34 are provided as holding elements at or near the locations on the two side walls 26 and 30 where zipper 24 begins and ends its zipping up of the opening in the bag 20.

Figure 3:
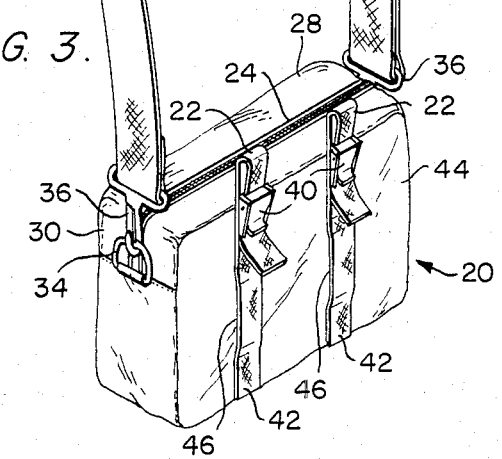
FIG. 3 is another schematic view of the first embodiment of the present invention being used as a shoulder bag.

In FIG. 3, the first embodiment of the bag 20 is shown being used as a shoulder bag. The rings 34 engage with and are detachable from spring clips 36 secured to opposite ends of a combination belt/shoulder strap BS adjustable by a sliding clip 38. As may be best seen in FIGS. 3 and 4, the size of the loops 22 is adjustable by pivotable clips 40. These loops 22 are the ends of small straps 42 sewed or otherwise secured to a back wall 44 of the bag 20.

Figure 4:
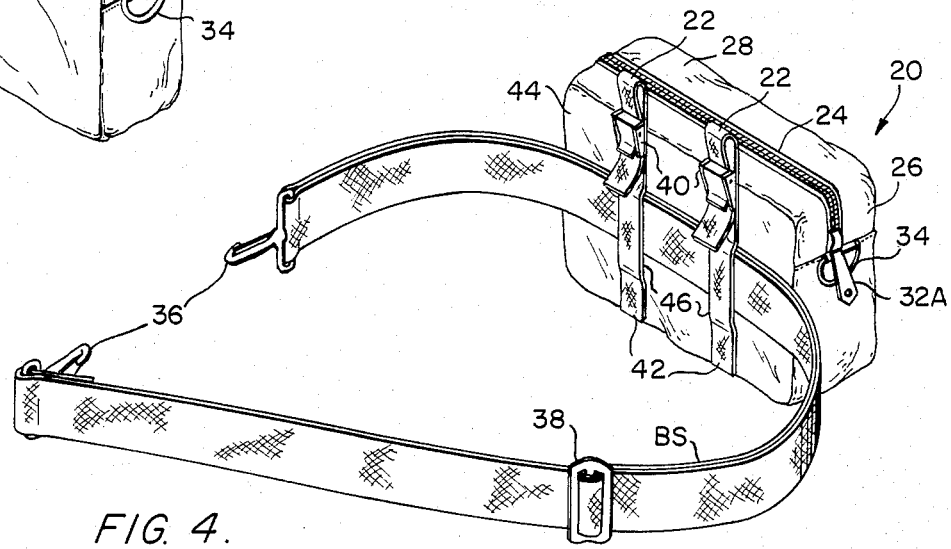
FIG. 4 is another schematic view of the first embodiment of the present invention being used as a belt bag, also euphemistically sometimes referred to as a "fanny" pack or ski bag.

In FIG. 4, the first embodiment of the bag 20 is being used as a belt bag. The small straps 42 are not secured completely to the back wall 44 of the bag 20 but openings 46 are provided thereunder so that the belt strap BS may be slipped therethrough. A hiker or rock climber usually secures the belt strap BS around his or her waist by adjusting the length of the belt strap BS with the sliding clip 38 and by attaching together the spring clips 36 so that the bag 20 is in front of the body whereas a skier or a mountain climber usually secures the bag 20 around the lower back of the body, thus turning the belt bag into a "fanny" pack.

The use of the first embodiment of the invention may be understood from a review of FIGS. 5 through 9 which show various steps in the process of converting the bag 20 to a backpack.

Figure 5:
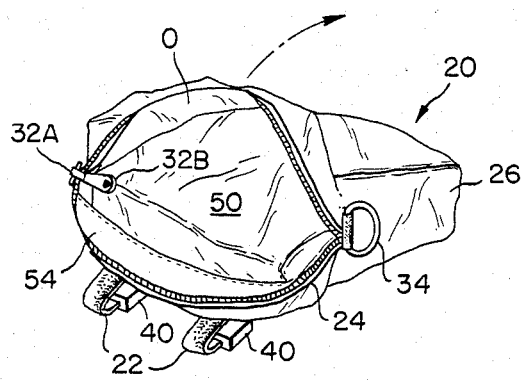
FIG. 5 is a schematic view of the first step of unzipping a small pouch of the first embodiment in a method of using the present invention.

In FIG. 5, the bag 20 first has its zipper 24 unzipped by pulling the tab 32A completely across the opening. As may be seen the interior of the pouch-like body of the bag 20 is divided into an open storage space O and a large adjacent space. A backpack 50 is folded down in the adjacent space in a compact manner. In essence, the bag 20 has two adjacent inside areas, one being the open storage space O and the other containing the folded backpack 50. The bag 20 is then turned inside out so that the folded backpack 50 becomes accessible to the user, as shown in FIG. 6, for unfolding.

Figure 6:
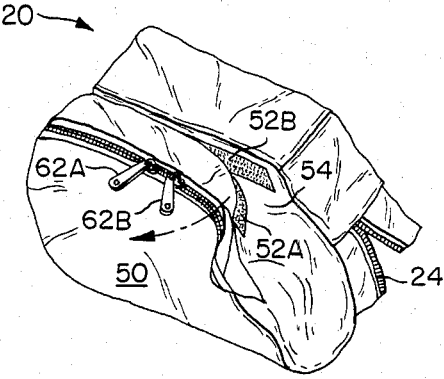
FIG. 6 is a schematic view of a later step of releasing a velcro closure to reveal a backpack in the method of using the present invention.

In FIG. 6, the folded backpack 50 is shown to be accessible to the user but secured by a first Velcro strip 52A on the backpack 50 to a second Velcro strip 52B attached to a wall 54 of the pouch-like body, formerly inside (see FIG. 5) the turned-inside-out bag 20. By pulling apart the Velcro strips 52A and 52B in the direction shown by the arrow in FIG. 6, the backpack 50 becomes unfolded in a face-down position illustrated in FIG. 7.

Figure 7:
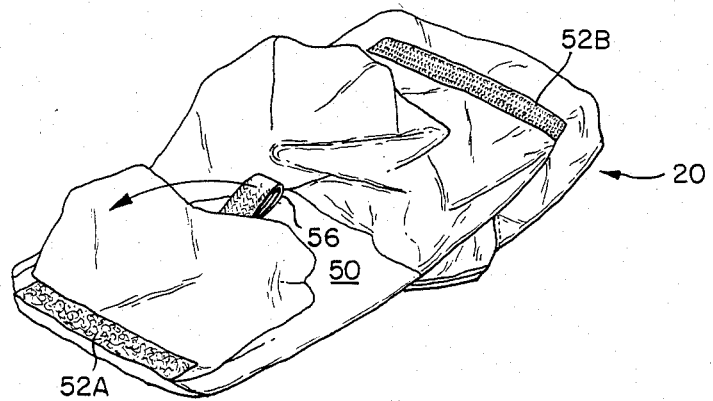
FIG. 7 is a schematic view of a still later step of unfolding the backpack in the method of using the present invention.

In FIG. 7, the backpack 50 is further unfolded by flipping forward a loop 56 in the direction of the arrow so that backstraps 58 (FIG. 8 only) become accessible to the user.

Figure 8:
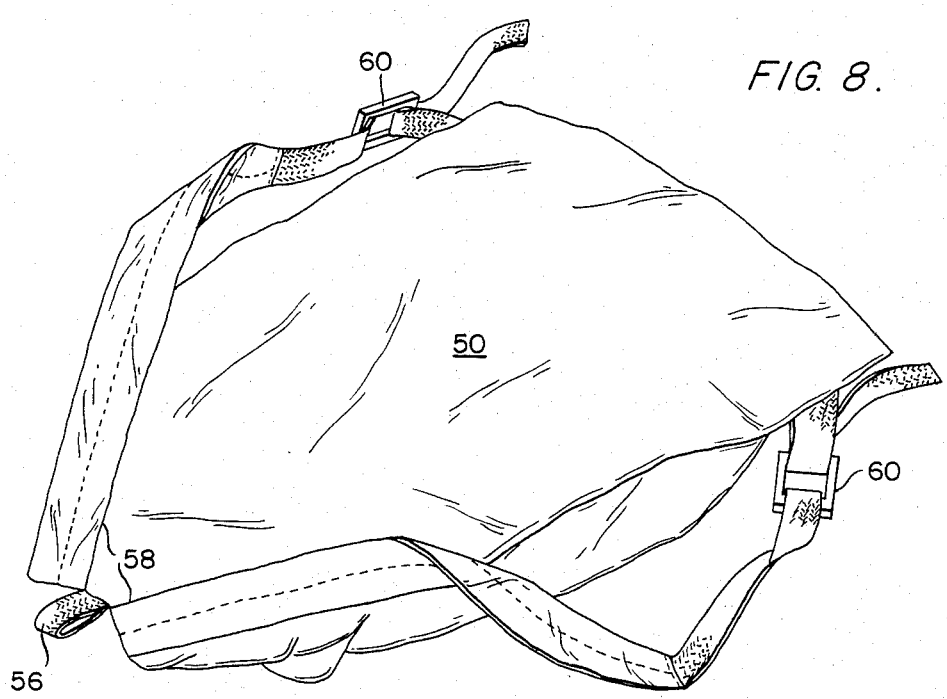
FIG. 8 is a schematic view of the last step of completely unfolding the face-down backpack in the method of using the present invention.

In FIG. 8, the backpack 50 is shown completely unfolded in a face-down position. The backstraps 58 are changeable to suit any particular user by manipulating adjustors 60.

Figure 9:
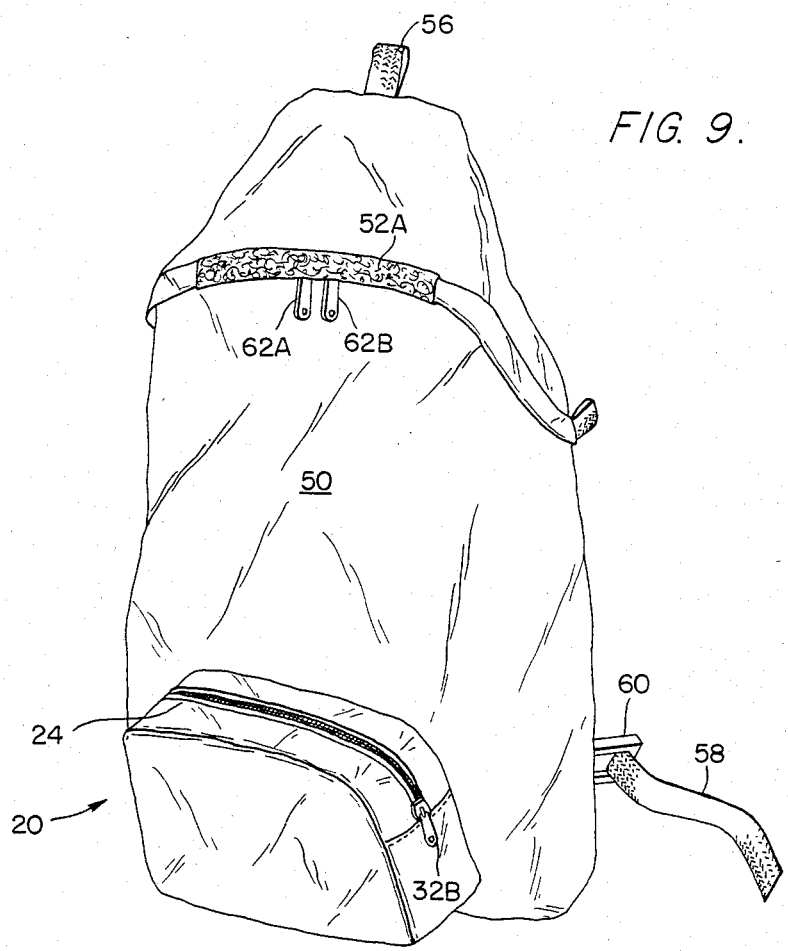
FIG. 9 is a schematic view of the completely unfolded backpack ready to be worn.

In FIG. 9, the backpack 50 is shown lifted by the loop 56 so that the backpack 50 is ready for use with the turned-inside-out bag 20 (from which backpack 50 was unpacked) being attached to the exterior of the backpack 50. It should be recognized now, from viewing FIG. 9, together with FIG. 5, that the present invention makes use of a duplicate pull tab 32B on the opposite side of the pull tab 32A. Double pull tabs 62A and 62B, both on the exterior of the backpack 50, open and close a storage area inside the backpack 50. The location of the double pull tabs 62A and 62B is beneath the Velcro strip 52A, shown also in FIGS. 6 and 7.

Figure 10:
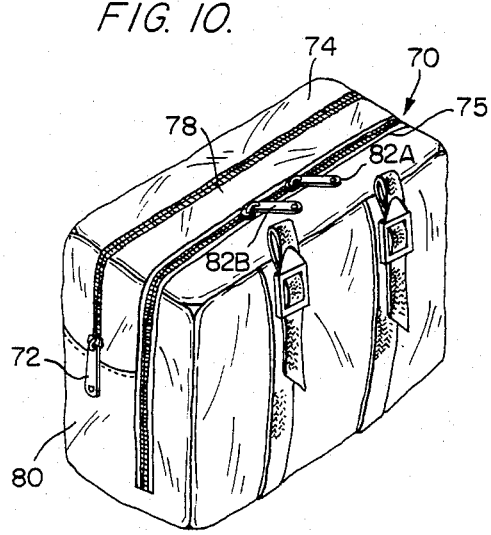
FIG. 10 is a schematic view of a second embodiment of the multiple-use sports bag of the present invention.

In FIG. 10, a second embodiment of the present invention is shown as another multiple-use sports bag 70. Its elements are analogous to most elements of the sports bag 20, best shown as the first embodiment of the present invention in FIGS. 1–4. A first zipper 74 in the bag 70 is analogous to the sole zipper 24 in the bag 20. However, in this second embodiment, there is also a second zipper 75 in the bag 70 parallel to the first zipper 74. This second zipper 75 extends almost completely from the bottom of one side wall 76 (FIG. 11 only), across a top wall 78, down to the bottom of an opposite side wall 80.

Sports bag 70 may be opened by pulling on a tab 72 in the same manner as the sports bag 20 may be opened by pulling on the tab 32A, best shown in FIG. 5, to provide access to the internal storage space O.

Figure 11:
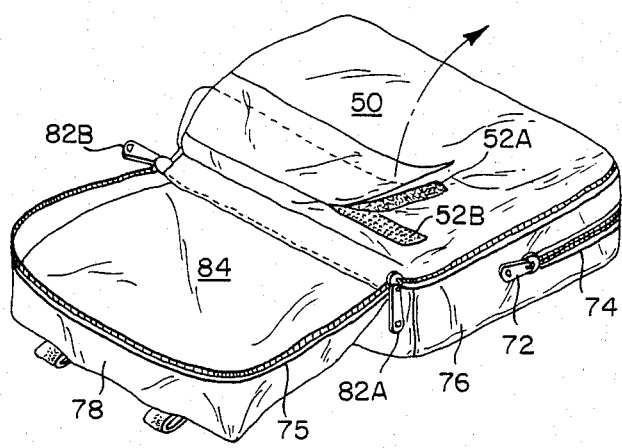
FIG. 11 is a schematic view of the first step of unzipping the small pouch of the second embodiment in a method of using the present invention in a suitcase-like manner.

In FIG. 11, the sports bag 70 is shown being opened on its side opposite from the zipper 74, in a suitcase-like manner by pulling on the tabs 82A and 82B in opposite directions so as to provide access to a second storage space 84. The backpack 50 may then be unfolded by pulling apart the Velcro strips 52A and 52B in the direction shown by the arrow in the same manner as the backpack 50 is unfolded in FIG. 6 illustrating the first embodiment. The remaining steps of unfolding the backpack 50 in the second embodiment constituted by the sports bag 70 are analogous to the steps of unfolding the backpack 50 in the first embodiment constituted by the sports bag 20 shown in FIGS. 7–9.

The backpack 50 may be refolded and replaced in either or both sports bags 20 and 70 by reversing the steps shown in FIGS. 5–9 for the first embodiment of the present invention. For example, when refolding the backpack 50, first place it face down on a flat surface as shown in FIG. 8, then fold it into thirds lengthwise. Be sure to be neat and tuck the straps 58 inside the lengthwise folds. Next, fold the backpack 50 into thirds widthwise. See FIG. 7. Match up the Velcro strips 52A and 52B as shown in FIG. 6 and lastly turn the sports bag 20 inside out so that it resumes its pouch-like appearance shown in FIG. 5. Small personal items may be placed in the storage spaces O and 84 before the various tabs are pulled to close such storage spaces O and 84.

These two embodiments of the present invention are considered to be illustrative only. Other modifications will be readily discerned by those skilled in the pertinent technology. In any event, the scope of the invention is intended to be covered by both the letter and the spirit of the claims appended hereto.

I claim:

1. A multiple-use sports bag comprising:
   a pouch-like body having an exterior and an interior surface of six substantially rectangular walls, and also having an interior space being divided into a first open storage space on one side and an adjacent space next to a wall of the interior surface;

a backpack folded into the adjacent space;
a first strip means, attached to the backpack, and a second strip means, attached to the wall of the interior surface, for securing together the backpack folded into the adjacent space;
a zipper means, secured between the exterior surface and the interior surface of the pouch-like body, for providing access to the first open storage space and the adjacent space; and
a first tab means, secured to the zipper means on the exterior surface of the pouch-like body, and a second tab means, secured to the zipper means on the interior surface of the pouch-like body, for opening and closing the zipper means;
whereby, when the backpack is removed from the adjacent space, and unfolded into a use position, the pouch-like body is inverted so that the interior and exterior surfaces are reversed.

2. The multiple-use sports bag, according to claim 1, further comprising:
small straps being secured to the exterior surface of the pouch-like body such that a portion of each small strap may be spaced from the exterior surface of the pouch-like body in order to form openings between the small straps and the exterior surface of the pouch-like body.

3. The multiple-use sports bag, according to claim 2, further comprising:
loop means, formed on one end of the small straps, for attaching the pouch-like body to a carrier.

4. The multiple-use sports bag, according to claim 3, further comprising:
means, attached to the loop means, for adjusting the size of the loop means.

5. The multiple-use sports bag, according to claim 2, further comprising:
holding elements attached to the exterior surface of the pouch-like body.

6. The multiple-use sports bag, according to claim 5, further comprising:
means, slipped through the openings, for attaching the pouch-like body around the waist of a person.

7. The multiple-use sports bag, according to claim 6, further comprising:
means, attached to the attaching means, for adjusting the length of the attaching means.

8. The multiple-use sports bag, according to claim 6, further comprising:
means, secured to opposite ends of the attaching means, for clipping the attaching means into a belt.

9. The multiple-use sports bag, according to claim 5, further comprising:
means, attached to the holding elements, for carrying the pouch-like body across the shoulder of a person.

10. The multiple-use sports bag, according to claim 6, further comprising:
means, secured to opposite ends of the attaching means, for clipping the holding elements in order to form the attaching means into a shoulder strap.

11. The multiple-use sports bag, according to claim 6, wherein:
said attaching means is a belt strap usable in alternative carrying configurations.

12. The multiple-use sports bag, according to claim 8, wherein:
said attaching means is a belt strap usable in alternative carrying configurations.

13. A method of converting a multiple-use sports bag to a backpack, comprising the steps of:
a. providing a pouch-like body with an exterior and an interior surface;
b. dividing the interior of the pouch-like body into a first open storage space and an adjacent space;
c. unzipping a first zipper secured between the exterior and the interior surface of the pouch-like body to provide an opening in the pouch-like body;
d. turning the pouch-like body inside out through the opening in the pouch-like body so that a backpack in a folded condition is accessible;
e. separating a first strip means from a second strip means in order to unsecure the backpack from a wall of the interior surface, now turned out of the pouch-like body; and
f. unfolding the backpack from the adjacent space.

* * * * *